(12) United States Patent
Heinrich et al.

(10) Patent No.: US 7,582,578 B2
(45) Date of Patent: Sep. 1, 2009

(54) TEXTILE COMPOSITE MATERIAL COMPRISING ACTIVATED CARBON FIBRES AND PRODUCTION THEREOF

(75) Inventors: Peter Heinrich, Moers (DE); Günter Reek, Leverkusen (DE); Thomas Stoll, Metzingen (DE)

(73) Assignee: Blücher GmbH, Erkrath (DE)

( * ) Notice: Subject to any disclaimer, the term of this patent is extended or adjusted under 35 U.S.C. 154(b) by 612 days.

(21) Appl. No.: 11/172,175

(22) Filed: Jun. 30, 2005

(65) Prior Publication Data

US 2007/0004301 A1    Jan. 4, 2007

(30) Foreign Application Priority Data

Jul. 5, 2004    (DE)    ........................ 10 2004 032 563

(51) Int. Cl.
*B32B 27/04*    (2006.01)
*B32B 5/02*    (2006.01)

(52) U.S. Cl. ........................ 442/122; 442/121; 442/179; 428/299.1

(58) Field of Classification Search ................. 442/121, 442/122, 179
See application file for complete search history.

(56) References Cited

U.S. PATENT DOCUMENTS

| | | | |
|---|---|---|---|
| 4,869,947 A | * | 9/1989 | Kirayoglu .................... 428/198 |
| 5,928,986 A | | 7/1999 | Parmentier et al. .......... 502/416 |
| 5,997,287 A | | 12/1999 | Parmentier et al. ............. 432/59 |
| 6,120,841 A | | 9/2000 | Parmentier et al. .......... 427/227 |
| 2003/0032556 A1 | | 2/2003 | Ouvry ........................ 502/418 |

FOREIGN PATENT DOCUMENTS

| | | | |
|---|---|---|---|
| DE | 43 10 110 | | 1/1994 |
| DE | 196 47 366 B4 | | 5/1997 |
| EP | 698 09 718 T2 | | 9/1998 |
| EP | 0 966 558 B1 | | 11/2002 |
| EP | 1468 732 | | 10/2004 |
| WO | WO 93/08024 | * | 4/1993 |
| WO | WO 98/41678 | | 9/1998 |
| WO | WO 01/70372 A1 | | 9/2001 |

* cited by examiner

*Primary Examiner*—Lynda Salvatore
(74) *Attorney, Agent, or Firm*—Woodard, Emhardt, Moriarty, McNett & Henry LLP

(57) ABSTRACT

The present invention relates to a textile sheetlike structure (1), in particular for protection against biological and chemical noxiants and poisons, such as biological and chemical warfare agents. The sheetlike structure (1) having a textile support layer (2) and a first sheetlike piece (3) of activated carbon fibers which is laminated onto the support layer (2), wherein the sheetlike structure (1) further comprises a second sheetlike piece (4) of activated carbon fibers which is laminated onto the support layer (2) such that edges of the two sheetlike pieces (3, 4) touch and/or overlap and wherein the two sheetlike pieces (3, 4) are joined together by the support layer (2). This provides a seamless joining together of two or more sheetlike pieces to form a continuous sheetlike structure of activated carbon fibers to provide an improved material for use in the production of protective articles.

21 Claims, 2 Drawing Sheets

TEXTILE COMPOSITE MATERIAL COMPRISING ACTIVATED CARBON FIBRES AND PRODUCTION THEREOF

CROSS-REFERENCES TO RELATED APPLICATIONS

Applicant claims foreign priority benefits under 35 U.S.C. 119(a)-(d) of the following foreign application for patent: German Application No. DE 10 2004 032 563.5, filed Jul. 5, 2004, which is hereby incorporated by reference in its entirety.

BACKGROUND OF THE INVENTION

The present invention relates to a textile sheetlike structure in the form of a composite material, in particular for protection against biological and chemical noxiants and poisons, such as biological and chemical warfare agents, as defined in the preamble of Claim 1. Furthermore, the present invention relates to a process for producing such material. The present invention further relates to the use of this textile sheetlike structure for producing protective materials of any kind, such as for example protective suits, protective gloves, protective footwear (protective boots for example) and other protective clothing items, and also protective covers (e.g. to transport casualties for example), sleeping bags and the like, not only for the military sector but also for the civilian sector, in particular for NBC utilization. Finally, the present invention relates also to the aforementioned protective materials themselves.

Activated carbon has fairly unspecific adsorptive properties and for this reason is the most widely used adsorbent. Legislative regulations as well as the rising sense of responsibility for the environment lead to a rising demand for activated carbon. Furthermore, activated carbon is also employed in protective materials against chemical and biological noxiants and poisons.

Activated carbon is generally obtained by carbonization (also referred to by the synonyms of smoldering and pyrolysis) and subsequent activation of carbonaceous starting materials, preferably compounds or materials which lead to economically reasonable yields. The weight loss through the split-off or cleavage of volatile constituents in the course of carbonizing and through the burn-off in the course of activating are immense. Whereas carbonization is the conversion of a carbonaceous starting material into carbon, the subsequent activation involves a controlled burn-off of the activated carbon to increase the porosity and thus the internal surface area (pore volume) and consequently the performance capability of the activated carbon. The properties and compositions of the activated carbon produced, whether finely or coarsely porous, firm or brittle, is also dependent on the starting material. Examples of customary starting materials are coconut shells, wood wastes, turf, bituminous coal, pitches, polymers, but also plastics which play a part, inter alia, in the production of activated carbon wovens. For further details concerning the production of activated carbon, see for example H. v. Kienle and E. Bäder, "Aktivkohle und ihre industrielle Anwendung" [Activated Carbon and Its Industrial Application], Enke Verlag Stuttgart, 1980.

Activated carbon is used in various forms: pulverized carbon, splint coal carbon, granular activated carbon, molded carbon and spherical activated carbon as well as in the form of activated carbon fibres, in particular in the form of sheetlike structures composed of activated carbon fibres. Such activated carbon fibre sheetlike structures are employed, for example, in the production of protective materials of any kind as mentioned above.

The production of activated carbon fibre sheetlike structures is described, for example, in WO-A-98/041678 and its equivalents EP 0 966 558 B1 and DE 698 09 718 T2 or in WO-A-01/70372 and in DE 196 47 366 A1. The general procedure involved is to lead a textile sheetlike structure composed of a suitable carbonizable starting material (examples being cellulose, viscose, cotton, polyacrylonitrile, etc.) through a carbonizing and activating kiln or furnace, wherein the maximum web width of the starting material (i.e. the maximum breadth of the starting textile material to pass the kiln or furnace) which can be used is limited by the kiln or furnace dimensions. The carbonization with subsequent activation, moreover, causes an appreciable shrinkage of the material, so that the end-product, i.e. the ready-produced carbonized and activated carbon fibre sheetlike structure, has a distinctly smaller web width if compared with the starting material, with shrinkage values of up to 30% or more for the end-product compared with the starting material occurring in the course of production, depending on the production process.

Customary carbonizing and activating kilns or furnaces for these purposes generally cannot be used to fabricate activated carbon fibre sheetlike structure webs more than 120 cm wide. This leads to the decisive disadvantage of a poor making-up utilization of in some instances below 60% of this material when it is processed or to be more precise cut for the production of the aforementioned protective materials (for example NBC protective suits and the like). The term "making-up utilization"—sometimes also synonymously called "making-up yield factor", "utilization degree", "utilization factor", "utilization rate", "exploitation degree of the material" etc.—characterizes the percentage of the starting material which may be utilized to manufacture the end-product, i.e. the ready-made protective garment; when the making-up yield factor is e.g. only 60% and below, this means that 40% and more of the starting textile material is lost (i.e. it cannot used) due to the cutting and subsequent processing of the starting textile material to the desired final products (e.g. protective garments etc.).

The object of the present invention consequently is to provide a process and a material at least substantially avoiding or at least minimizing the above-described disadvantages of the prior art.

A further object of the present invention is to provide a process for producing activated carbon fibre sheetlike structures having greater web width to thereby permit an improved making-up utilization in the course of the production of the aforementioned protective materials (for example protective suits and the like).

To solve the problem described above, the present invention proposes a textile sheetlike structure in the form of a composite material as described herein. Various advantageous embodiments of textile sheetlike structure of the present invention are also disclosed herein.

The present invention further provides protective materials, in particular protective suits, protective gloves, protective footwear (protective boots, for example) and other protective clothing items and also protective covers (e.g. to transport casualties for example), protective sleeping bags and the like which are produced using the textile sheetlike structure of the present invention or which comprise the textile sheetlike structure of the present invention. The present invention thus also relates to the use of the textile sheetlike structure of the present invention for producing the aforementioned protective materials.

The present invention finally relates to a process for producing the textile sheetlike structure of the present invention.

BRIEF SUMMARY OF THE INVENTION

According to a first aspect of the present invention, there is accordingly provided a gas-pervious, water-pervious and water-vapour-pervious textile sheetlike structure in the form of a composite material, in particular for protection against biological and chemical noxiants and poisons, such as biological and chemical warfare agents, said textile sheetlike structure comprising a textile support layer onto which two sheetlike pieces of activated carbon fibres are laminated such that edges of the two activated carbon fibre sheetlike pieces touch and/or overlap, the two activated carbon fibre sheetlike pieces being joined together by the textile support layer to thereby form a quasi continuous, unitary activated carbon fibre sheetlike layer. The term "sheetlike" as used herein denotes a flat or flat-shaped, two-dimensional structure. The term "support layer" as used herein denotes a carrier layer for the sheetlike pieces of activated carbon fibres.

This makes it possible to produce activated carbon fibre sheetlike structures of any desired width, which consist or are made up of individual activated carbon fibre sheetlike pieces whose respective width is again predetermined or restricted by the manufacturing operation. The individual activated carbon fibre sheetlike pieces are thus joined together seamlessly and effectively via a textile support layer. At the transitioning sites or areas between any two activated carbon fibre sheetlike pieces, the respectively adjacent edges or borders of two activated carbon fibre sheetlike pieces touch over the entire touching length, and the touching of the adjacent edges or borders of two activated carbon fibre sheetlike pieces may be configured or designed such that either these edges or borders of the two activated carbon fibre sheetlike pieces flushly abut or else overlap. This permits an efficient joining together of two or more sheetlike pieces of activated carbon fibres to form a total activated carbon fibre sheetlike structure of infinitely adjustable dimension or width, respectively.

When this material is then used to produce protective materials of the aforementioned kind (for example protective suits, protective gloves, protective footwear, etc.), this leads to an appreciably improved making-up utilization, in particular with respect to the cutting for size of the material in the course of the production of the aforementioned protective materials. More particularly, the making-up yield factor can be increased to above 90%, compared with the individual activated carbon fibre sheetlike pieces; that is, more than 90% of the textile sheetlike structure of the present invention can be utilized in the course of its processing into the aforementioned protective materials, leaving less than 10% of cutting waste or unutilizable remnants. In contrast to this, the making-up yield factor for individual activated carbon fibre sheetlike pieces, not joined together, is in some instances only below 60%.

Further advantages, properties, aspects and features of the present invention will be apparent from the following description of a preferred example depicted in the drawings.

DETAILED DESCRIPTION OF THE INVENTION

Figure 1A:
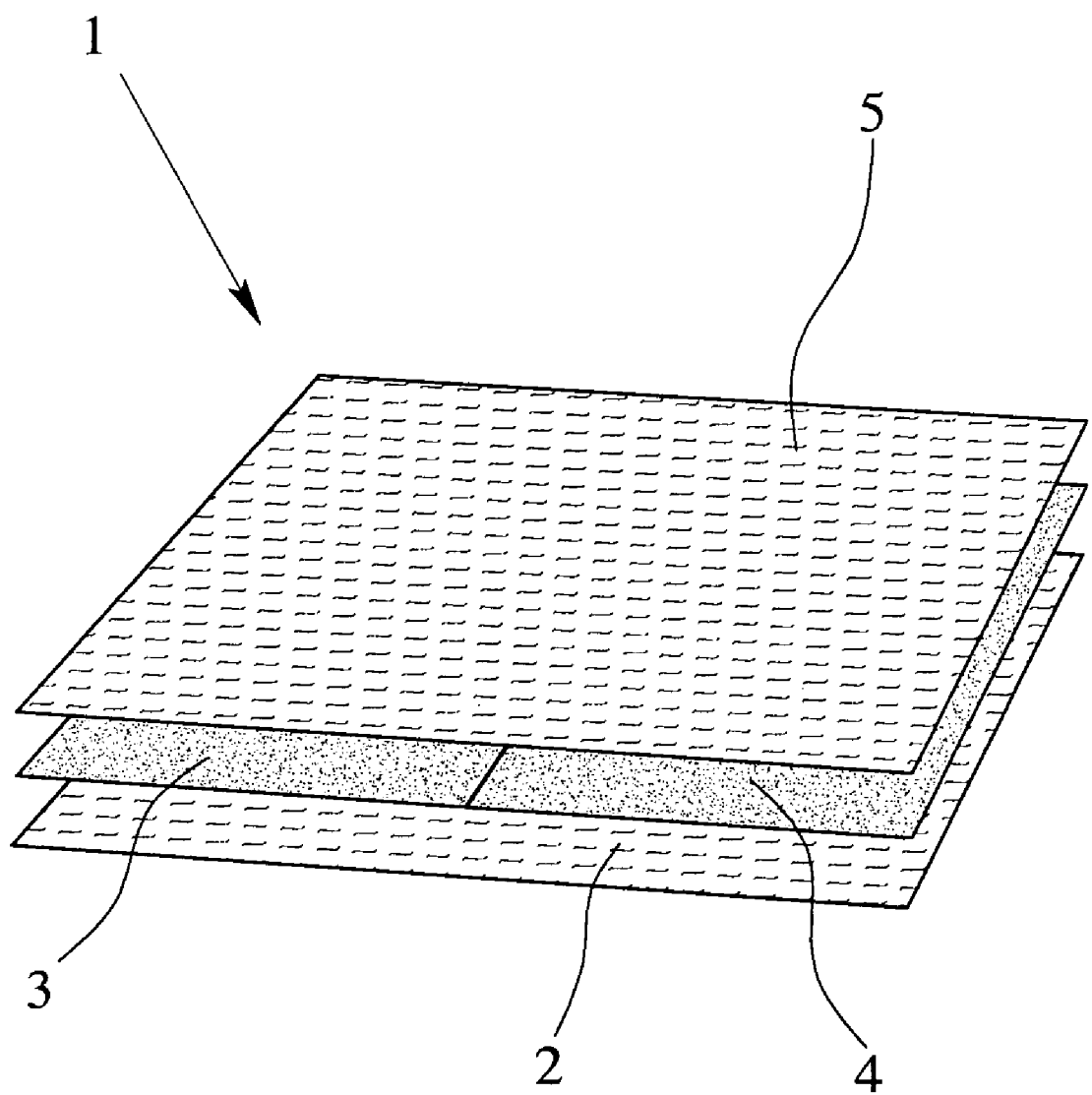
FIG. 1A shows a schematic, exploded depiction of a textile sheetlike structure of the present invention according to a first embodiment whereby the edges of the two joined or assembled sheetlike pieces of activated carbon fibres touch each other and flushly terminate relative to each other or flushly abut.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
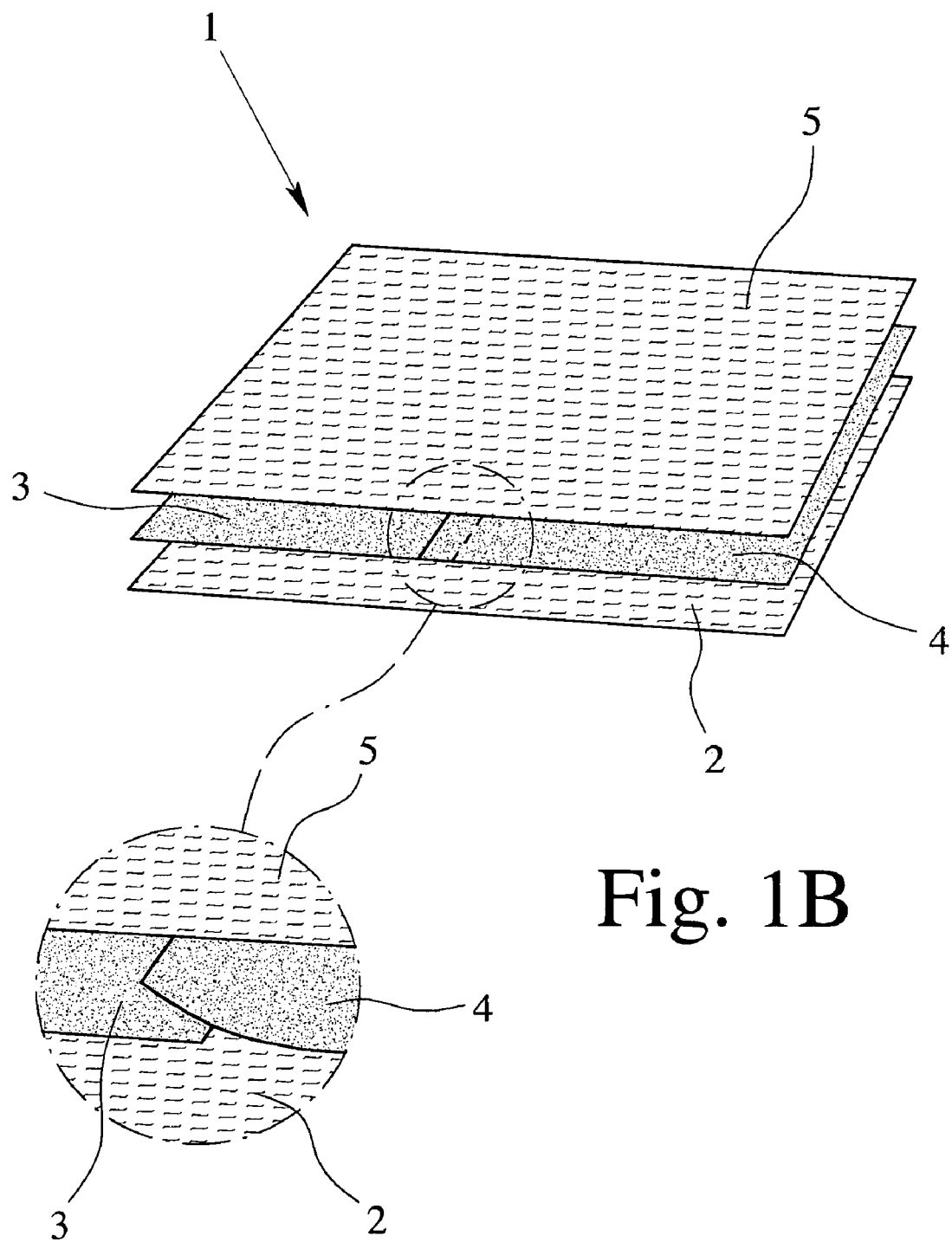
FIG. 1B shows a schematic, exploded depiction of a textile sheetlike structure of the present invention according to a second, alternative embodiment whereby the edges of the two joined or assembled sheetlike pieces of activated carbon fibres mutually overlap.

FIGS. 1A and 1B each show a schematic, exploded depiction of a textile sheetlike structure 1 according to the present invention. The textile sheetlike structure 1 of the present invention, which is in particular suitable for protection against biological and chemical noxiants and poisons, such as biological and chemical warfare agents for example, is constructed in the manner of a textile composite or laminate from a plurality of layers or plies 2, 3, 4, 5. The textile sheetlike structure 1 comprises a textile support layer 2 onto which is laminated a first sheetlike piece 3 of activated carbon fibres and a second sheetlike piece 4 of activated carbon fibres; that is, the two activated carbon fibre sheetlike pieces 3, 4 are durably joined to the textile support layer 2. The lamination of the two activated carbon fibre sheetlike pieces 3, 4 onto the support layer 2 is effected such that, on the one hand, the two sheetlike pieces 3, 4 are joined together by the support layer 2 and, on the other, the edges or borders of the two sheetlike pieces 3, 4 touch and/or overlap each other, preferably over the entire length of the touching or overlapping edges or borders.

The term "lamination"—herein also referred to synonymously as "lamination coating"—is to be understood as meaning in particular the joining together of two or more plies or layers by means of suitable laminating agents (=adhesives for example); cf. Römpp, Chemielexikon, 10th Edition, Volume 3, 1997, Georg Thieme Verlag Stuttgart/New York, page 2088, headword: "Kaschieren" [lamination coating]. The technique of lamination per se is well known to the skilled practitioner.

In a first embodiment, as depicted in FIG. 1A, the two sheetlike pieces 3, 4 touch such that their respective edges or borders flushly abut along the entire touching length, leaving no gap between the two sheetlike pieces 3, 4 joined together via the support layer 2. This produces a unitary, uninterrupted activated carbon fibre sheetlike layer from the two sheetlike pieces 3, 4. To ensure that the two sheetlike pieces 3, 4 flushly or closely abut along the entire length of the respectively touching edges or borders, the two sheetlike pieces 3, 4 are preferably cut to size directly before they are laminated onto the support layer 2, so that the adjoining edges or borders of the activated carbon fibre sheetlike pieces 3, 4 are mutually compatible and flushly adjoin or abut each other.

In a second, alternative embodiment, as depicted in FIG. 1B, the activated carbon fibre sheetlike pieces 3, 4 are laminated onto the textile support layer 2 such that the mutually adjoining edges or borders of the two sheetlike pieces 3, 4 overlap, the sheetlike pieces 3, 4 being, at the same time, durably joined to the textile support layer 2 and joined together via this support layer 2. The detail enlargement of the marked region of FIG. 1B shows one outer edge region of the sheetlike piece 4 flipped up for illustrative purposes only; it will be appreciated that in the ready-produced material 1 itself this outer edge region of the sheetlike piece 4 is resting directly and coextensively on the sheetlike piece 3. This embodiment also gives rise to a unitary, continuous activated carbon fibre sheetlike layer made up of the two activated carbon fibre sheetlike pieces 3, 4. In this embodiment, the two sheetlike pieces 3, 4 may be additionally joined together in the overlapping region, in particular by adhering, preferably by dotwise discontinuous application of adhesive in the form of non-cohering dots of adhesive, as will be described hereinbelow. In this embodiment, it is advantageous when the two overlapping sheetlike pieces 3, 4 mutually overlap to an extent for each from 0.1% to 20%, in particular from 0.1% to 10% and preferably from 0.1% to 5% of their respective total area; this not only ensures good joining together of the two sheetlike pieces 3, 4 to form an uninterrupted activated carbon fibre sheetlike layer, but also means that the relatively small overlap keeps the material loss in proportion.

In the two embodiments described above and depicted in FIGS. 1A and 1B, the two sheetlike pieces 3, 4 are joined together by the textile support layer 2. In general, two sheetlike pieces 3, 4 will as a result be joined together seamlessly to form an uninterrupted activated carbon fibre layer.

The lamination of the two sheetlike pieces 3, 4 onto the support layer 2 is advantageously effected by adhering. The adhering is in each case preferably effected by a discontinuous application of adhesive in the form of non-cohering dots of adhesive. The term "dots of adhesive" refers, for the purposes of the present invention, in particular to very small droplets or heaplets of adhesive applied without touching each other atop the plies or layers to be adhered together.

In a particular embodiment of the present invention, depicted in FIGS. 1A and 1B, a textile covering layer 5 may additionally be laminated onto those sides of the first and second sheetlike pieces 3, 4 which are each opposite the textile support layer 2. Preferably, the two sheetlike pieces 3, 4 are adhered to this covering layer 5. This is accomplished in particular in each case by a discontinuous application of adhesive in the form of non-cohering dots of adhesive, as described above. In this particular embodiment of the present invention, the two sheetlike pieces 3, 4 are additionally joined together by the covering layer 5. The presence of a covering layer 5 has the advantage of, first, stabilizing the join of the two activated carbon fibre sheetlike pieces 3, 4 and, secondly, of protecting the two activated carbon fibre sheetlike pieces 3, 4 in use, in particular in protective materials, such as protective suits for example, against excessive stress and elongation, so that the activated carbon fibres are essentially not exposed to excessive abrasion.

Preferably, the two sheetlike pieces 3 and 4 are each, in each case based on one side of the sheetlike pieces 3 and 4, covered with adhesive to an extent of not more than 30%, in particular not more than 25%, preferably not more than 20% and more preferably not more than 15%, in order that a good join with the textile support layer 2 and the covering layer 5, if present, coupled with good gas-perviousness, water-perviousness and water-vapour-perviousness may be ensured. In other words, each of the two sides or surfaces of the activated carbon fibre sheetlike pieces 3 and 4 is free of adhesive to an extent not less than 70%, in particular not less than 75%, preferably not less than 80% and most preferably not less than 85%, and thus is freely accessible to the biological and chemical noxiants and poisons to be adsorbed. This ensures not only good adsorption efficiency and capacity but also good gas-perviousness, water-perviousness and water-vapour-perviousness. Yet the composite is sufficiently strong to withstand the mechanical stresses in use, in particular in the course of the wearing of protective suits. To produce a strong and mechanically stable composite it is generally sufficient for the adhesive to be applied in such amounts that it covers each of the two sheetlike pieces 3 and 4, in each case based on one side or surface of the sheetlike pieces 3 and 4, to an extent in the range of from 5% to 30%, in particular in the range of from 10% to 25% and preferably in the range of from 10% to 20%. This also provides good gas-perviousness, water-perviousness and water-vapour-perviousness, enhancing the wear comfort of protective suits and other protective clothing items when the textile sheetlike structure 1 of the present invention is used in them.

For this purpose, the adhesive is generally applied with an amount, calculated as the area weight or basis weight (dry weight), in the range of from 5 to 30 $g/m^2$, in particular in the range of from 5 to 25 $g/m^2$ and preferably in the range of from 10 to 20 $g/m^2$, all weight indications being based on one single side of the sheetlike pieces 3 and 4 (The term "area weight" or "basis weight" as used in this context denotes the amount of adhesive applied with respect to a specific area of the substrates to be bonded.). The aforementioned particulars are based on, in each case, one of the two sides or surfaces of the activated carbon fibre sheetlike pieces 3 and 4; the totally applied weight of adhesive based in each case on the entire sheetlike piece 3 or 4, i.e. on both sides or both surfaces of the sheetlike pieces 3 or 4, is consequently twice as high.

Advantageously, the adhesive is printed onto the textile support layer 2 and/or the sheetlike pieces 3, 4 and/or the covering layer 5, if present, in particular in the form of a regular or irregular grid or pattern, preferably in the form of an irregular, in particular computer-calculated grid or pattern such that a so-called lane or channel formation and thus a breakthrough of biological and chemical noxiants and poisons through the textile sheetlike structure 1 or to be more precise the activated carbon fibre layers 3, 4 may be avoided in the use state of the textile sheetlike structure 1 (The term "lane or channel formation" refers to the formation of lanes or channels in the material, through which the biological and chemical noxiants and poisons to be absorbed may pass without being absorbed). In general, such grids or patterns for the application of adhesive can be calculated and applied with computer assistance or under computer control (known as CP Adhesive Grid or Computer Point Adhesive Grid). This is well known to those skilled in the art. The application of the adhesive onto the textile support layer 2 and/or the sheetlike pieces 3, 4 and/or the covering layer 5, if present, in the form of an irregular grid or pattern, moreover, has the advantage that a visually undesirable so-called Moiré effect, as it is known, is avoided for the resulting adhered-together material.

The adhesive for fixing the activated carbon fibre sheetlike pieces 3, 4 to the textile support layer 2 or to the covering layer 5, if present, may be printed on, for example, through a screen whose clear diameter of holes for the application of adhesive is in the range of from 5 to 1,000 μm, in particular in the range of from 100 to 575 μm and preferably in the range of from 100 to 300 μm; this is the screen smallest hole diameter through which the adhesive is forced in the course of being applied through the screen. Due to the properties of the adhesive, in particular due its viscosity, and due the properties of the substrates to be adhered together (i.e. the textile support layer 2, the activated carbon fibre sheetlike pieces 3, 4 and, optionally, the covering layer 5), in particular their surface tension and their wettability with the adhesive, and also due to the contact pressure with which the individual layers are laminated to form a composite, the dots of adhesive present in the ready-produced textile sheetlike structure 1 on the substrates or layers to be adhered together are distinctly larger than the clear hole diameter of the application screen; the size of the dots of adhesive in the ready-produced material 1 can vary within wide limits and is generally in the range of from 100 to 10,000 μm and in particular in the range of from 500 to 5,000 μm, based on the average diameter of a dot of adhesive.

But in principle the adhesive can also be applied using any other suitable conventional method leading in particular to a discontinuous, preferably dotwise application of adhesive. For example, the adhesive can be applied by engraved roll application or else in a double spot process or the like.

Any adhesive known to one skilled in the art and used for adhering can be used. Thermoplastic adhesives are particularly suitable. Likewise of particular suitability are reactive and in particular isocyanate-reactive adhesives which lead to polyurethane-based adhesive bonds after crosslinking and curing. Also of particular suitability are combinations of various adhesives, which may be applied or to be more precise coated successively; this makes it possible to combine the properties of various adhesives in a single material.

The activated carbon fibre sheetlike pieces 3, 4 used in the present invention are in general activated carbon fibre sheetlike structures. These activated carbon fibre sheetlike structures may be for example textile wovens, fabrics, cloths, non-wovens, knitted fabrics, hosiery, knits of all kinds (such as e.g. formed-loop knits, drawn-loop knits, etc.), non-woven scrims, batts or textile composite materials, each composed of activated carbon fibres. It is preferable to employ activated carbon fibre fabrics, cloths or wovens as activated carbon fibre sheetlike structures for the sheetlike pieces 3, 4; this leads to the best results for the present invention.

The area weights or basis weights (i.e. the mass per area weights) of the activated carbon fibre sheetlike structures of the sheetlike pieces 3, 4 can vary within wide limits. The activated carbon fibre sheetlike structures used generally have area weights (=basis weights) in the range of from 50 to 250 g/m$^2$, in particular in the range of from 50 to 200 g/m$^2$, preferably in the range of from 80 to 180 g/m$^2$ and more preferably in the range of from 90 to 150 g/m$^2$. The thickness of the activated carbon fibre sheetlike structures used is typically in the range of from 0.1 to 10 mm, in particular in the range of from 0.2 to 0.8 mm and preferably in the range of from 0.3 to 0.5 mm. These values are referred to the cross-sectional thickness of the activated carbon fibres.

Particularly good mechanical stabilities combined with high adsorption capacity and adsorption efficiency are achieved when the activated carbon fibres of the first and/or second sheetlike pieces 3, 4 consist of carbonized and activated cellulose or viscose and/or of carbonized and activated polyacrylonitrile; particularly good results are achieved with activated carbon fibres composed of carbonized and activated polyacrylonitrile, which ensure the best mechanical stability.

The mechanical stability of the activated carbon fibre sheetlike structures of the sheetlike pieces 3, 4 can be further increased by using activated carbon fibre sheetlike structures which consist of so-called filament fibres, i.e. unspun or non-spun endless fibres. Filament or endless fibres are in particular practically endless fibres which are industrially manufactured in various ways and form a constituent of textile articles of manufacture in accordance with German standard specification DIN 60001 Part 2 (October 1990); for further details with regard to this matter reference can be made for example to Römpp Chemielexikon, 9th Edition, Volume 2, 1997, page 1336, headword: "Filament". Although activated carbon spun fibres (i.e. staple fibres) can in principle be used in the present invention, filament fibres are preferred according to the present invention for the aforementioned reasons, in particular because of their improved mechanical stability.

The mechanical stability of the activated carbon fibre sheetlike pieces 3, 4 can be further improved by using activated carbon fibres having a titre (i.e. a fineness or a gauge) of not less than 0.9 denier, in particular of not less than 1.0 denier, preferably of not less than 1.1 denier, more preferably in the range of from 0.8 to 1.2 denier and even more preferably in the range of from 1.0 to 1.2 denier.

To ensure good mechanical stability, the activated carbon fibres of the sheetlike pieces 3, 4 generally have a unit weight (i.e. a mass per length weight) in the range of from 1.0 to 2.0 g/m (grams/metre), in particular in the range of from 1.2 to 1.8 g/m and preferably in the range of from 1.4 to 1.6 g/m.

Preferably, the activated carbon fibres of the sheetlike pieces 3, 4 possess a tensile strength of more than 1.6 g/denier and preferably of more than 1.8 g/denier, which corresponds to the tear resistance of the fibres. The tensile elongation, i.e. the maximum extensibility, of the activated carbon fibres of the sheetlike pieces 3, 4 is preferably more than 8%, based on their original length. This ensures good mechanical strength.

To increase the wear comfort, on the one hand, and to improve the extensibility/strength properties of the activated carbon fibres of the sheetlike pieces 3, 4 and thus of the textile sheetlike structure 1 as a whole, on the other hand, the activated carbon fibres have a certain moisture content, which is generally in the range of from 5% to 15%, based on the activated carbon fibre weight.

It is preferable for the aforementioned reasons when the activated carbon fibres of the sheetlike pieces 3, 4 have a density of not less than 1.2 g/cm$^3$, in particular of not less than 1.3 g/cm$^3$, in particular of not less than 1.4 g/cm$^3$, and of up to 2.0 g/cm$^3$.

To be particularly useful for military as well as civilian use, it is advantageous when the activated carbon fibres of the sheetlike pieces 3, 4 are of low flammability and more particularly have a Limiting Oxygen Index (LOI) of not less than 50%. The flame-retarding properties can be further enhanced, either by adding flame retardants to the activated carbon fibres or else by impregnating the activated carbon fibres with flame retardant.

To ensure good adsorption performance and efficiency, the activated carbon fibres of the sheetlike pieces 3, 4 should have an internal surface area (BET, i.e. the specific inner surface of the activated carbon provided by pores, capillaries, cavities, etc. in the activated carbon structure) of more than 800 m$^2$/g, in particular of more than 900 m$^2$/g, preferably of more than 1,000 m$^2$/g, more preferably in the range of from 800 to 2,000 m$^2$/g and in particular in the range of from 1,000 to 1,500 m$^2$/g.

Activated carbon fibre sheetlike structures which have the aforementioned properties and, according to the present invention, are useful as sheetlike pieces 3, 4 are commercially available. For example, activated carbon fibre sheetlike structures useful in the present invention are marketed by CCTeks, or Challenge Carbon Technology Co., Ltd. and TCT Taiwan Carbon Technologies, Taiwan.

Activated carbon fibre sheetlike structures useful in the present invention can also be produced according to WO-A-98/041678 or its equivalents EP 0 966 558 B1 and DE 698 09 718 T2 or according to WO-A-01/70372, the entire contents of the aforementioned publications being hereby incorporated herein by reference.

To increase the adsorption efficiency or adsorption performance, the activated carbon fibres of the sheetlike pieces 3, 4 may be impregnated with one or more catalysts. Examples of catalysts useful in the present invention are enzymes and/or metals, in particular metal ions, preferably ions of copper, silver, cadmium, platinum, palladium, zinc and/or mercury. The amount of catalyst or catalysts can vary within wide limits; in general the amount of catalyst or catalysts will be in the range of from 0.05% to 12% by weight, preferably in the range of from 1% to 10% by weight and more preferably in the range of from 2% to 8% by weight, based on the activated carbon fibres.

The textile support layer 2 and the optional covering layer 5 of the textile sheetlike structure 1 of the present invention are generally configured or designed as textile support layers and as textiles, in particular as textile sheetlike structures. "Textile" and "textiles" are herein, in this context and in the description as a whole, to be understood very broadly, in particular in the meaning of DIN 60000: 1969-01. For further details in this regard reference may be made for example to Römpp Chemielexikon, 10th Edition, Volume 6, 1999, pages 4477 to 4483, in particular the headwords: "Textilien" [textiles], "Textilfasern" [textile fibres] and "Textilverbundstoffe" [textile compositions].

Examples of textile sheetlike structures useful as textile support layer 2 and as textile covering layer 5 are for example textile wovens, fabrics, cloths, non-wovens, knitted fabrics, hosiery, knits of all kinds (such as e.g. formed-loop knits, drawn-loop knits, etc.), non-woven scrims, batts or textile composite materials and the like. The support layer 2 and the covering layer 5 may have identical or different area-related or basis weights.

The area-related weights (basis weights) of the support layer 2 and of the optional covering layer 5 may vary within wide limits; in general, their area weights are in the range of from 10 to 100 $g/m^2$ and in particular in the range of from 15 to 75 $g/m^2$. As a result, the area weight of the textile sheetlike structure 1 is distinctly reduced as a whole.

In a preferred embodiment, the textile support layer 2 and the optional covering layer 5 are each configured or designed as lightweight textile non-wovens having area weights in the range of from about 25 to about 35 $g/m^2$.

As described above, the textile support layer 2 and also the activated carbon fibre sheetlike pieces 3, 4 and the covering layer 5 are water-pervious and water-vapour-pervious and also gas-pervious, in particular air-pervious, and due to the dotwise application of adhesive to fix the individual layers so is the textile sheetlike structure 1 as a whole as well. In particular with respect to the production of protective materials, such as protective garments, from the inventive textile sheetlike structure 1, this provides enhanced wear comfort.

The inventive lamination of the activated carbon fibre sheetlike pieces 3, 4 onto the textile support layer 2 provides uninterrupted and continuous activated carbon fibre sheetlike structures in any desired sheetlike extension or dimension, in particular in any desired width. This is exceedingly beneficial with regard to the further processing of the inventive textile sheetlike structure 1 in particular: when protective materials, for example protective garments, such as protective suits, are made up from the inventive textile sheetlike structures 1, improved utilization is achieved, in particular when the individual pieces are cut to size. The making-up yield factor (i.e. the exploitation degree of the material) can thereby be increased to above 90%, whereas conventional activated carbon fibre sheetlike structure webs of the prior art give a relatively poor making-up utilization of only below 60% in some instances.

The textile sheetlike structure 1 of the present invention can thus be the starting point for a seamless large-area production of activated carbon fibre sheetlike structures in any desired size.

The textile sheetlike structure 1 of the present invention can be used in particular for production of protective materials of any kind, in particular of protective suits, protective gloves, protective footwear (protective boots for example) and other protective clothing items and/or protective covers and protective sleeping bags and the like, in particular for civilian and military purposes, preferably for NBC utilization. The protective materials produced in this way are also subject matter of the present invention.

The present invention further provides a process for producing a textile sheetlike structure configured or designed in particular as described above, in particular for protection against biological and chemical noxiants and poisons, such as biological and chemical warfare agents, which process comprises producing a first web-shaped (i.e. in the shape of a textile breadth or textile width) sheetlike structure from activated carbon fibres and producing a second web-shaped sheetlike structure from activated carbon fibres and laminating these sheetlike structures onto a textile support layer, wherein the second web-shaped sheetlike structure is produced from activated carbon fibres and laminated onto the textile support layer transversely to the longitudinal extension and offset from the first web-shaped sheetlike structure, so that longitudinal edges of the two web-shaped sheetlike structures touch and/or overlap, and wherein the two web-shaped activated carbon fibre sheetlike structures are joined together by the textile support layer. In general, the lamination of the two webs of activated carbon fibres onto the textile support layer takes place simultaneously, since this ensures a gapless meeting of the two webs on the support material.

For further details concerning the process of the present invention, reference can be made to the above explanations and description concerning the textile sheetlike structure of the present invention, which apply mutatis mutandis also to the process of the present invention.

Corresponding to the two forms of embodiments with respect to the textile sheetlike structure according to the present invention, the process of the present invention can be carried out according to two embodiments or variants:

In a first embodiment of the process according to the present invention, the two web-shaped sheetlike structures composed of activated carbon fibres are brought together and laminated onto the textile support layer such that they touch or do not overlap along their borders or edges, i.e. they abut flushly along their touching borders or edges. To achieve this, it is advantageous when the two web-shaped activated carbon fibre sheetlike structures to be joined together are, immediately before they are laminated onto the textile support layer, cut to size such that the touching borders or edges of the two web-shaped sheetlike structures are mutually compatible. This can be accomplished, for example, by the two web-shaped sheetlike structures composed of activated carbon fibres being initially brought together and so that they overlap slightly only immediately before they are laminated onto the textile support layer, a cut being made into the overlapping region such that the touching borders or edges of the two web-shaped sheetlike structures which are to be brought together are compatible relative to each other or abut each other flushly.

The second variant, which is a little simpler to carry out from a process-engineering viewpoint, consists in the two web-shaped activated carbon fibre sheetlike pieces being brought together immediately before their lamination onto the textile support layer such that they overlap along their touching edges or borders and are overlappingly laminated onto the textile support layer, so that they remain overlappingly laminated onto the textile support layer in the resulting end-product as well. Compared with the first embodiment of the process according to the present invention, the second embodiment of the process according to the present invention has the advantage that the two web pieces to be brought together do not have to be cut to size before they are laminated, so that one operation or process step is saved. For further details in this respect, reference can be made to the above description and explanations concerning the textile sheetlike structure of the present invention, which apply here mutatis mutandis.

After the two web-shaped sheetlike structures composed of activated carbon fibres have been laminated onto the textile support layer, and optionally after an additional covering layer has been laminated onto the side of the web-shaped sheetlike structures which is opposite the support layer, the resulting material can be further processed or, to be more precise, can be cut to form a textile sheetlike structure which is in accordance with the present invention.

In the prior art, by contrast, activated carbon fibre sheetlike structures and activated carbon wovens in particular can generally not be fabricated to a web width above 120 cm, leading to a poor making-up utilization (i.e. a poor exploitation degree with respect to the starting material to be cut) of only below 60% in some instances. In contrast to this, the present invention makes it possible to produce utilizable web widths in any desired size including far above 120 cm in order that the making-up yield factor may be increased to above 90%. The technology according to the present invention thus makes it possible for the first time, among other achievements, to fabricate activated carbon wovens, fabrics and cloths based on activated carbon fibre in web widths of above 120 cm and distinctly more.

The process of the present invention thus has a typical embodiment where two or even more than two webs of activated carbon fibre sheetlike structures, in particular activated carbon wovens, fabrics and cloths, are brought together in one operation such that an exceedingly wide web material without seam is produced; this is accomplished by the webs either being laminated overlappingly onto the support layer or being cut prior to lamination such that the borders are led seamlessly close to one another or flush.

Further details, refinements, modifications and variations of the present invention will become apparent to and realizable by the skilled practitioner when reading the description without him leaving the scope of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. Textile sheetlike structure for protection against biological and chemical noxiants and poisons such as biological and chemical warfare agents, said sheetlike structure comprising:
   a textile support layer and a first sheetlike piece made of activated carbon fibres, said first sheetlike piece being laminated onto said support layer;
   wherein said sheetlike structure further comprises a second sheetlike piece made of activated carbon fibres, said second sheetlike piece being laminated onto said support layer such that edges of said two sheetlike pieces touch and/or overlap; and
   wherein said two sheetlike pieces made of activated carbon fibres are joined together seamlessly to said support layer;
   wherein said two sheetlike pieces made of activated carbon fibres are laminated onto said support layer by adhering; and
   wherein said first and/or second sheetlike pieces made of activated carbon fibres are selected from the group consisting of a textile woven, a fabric, a cloth, a non-woven, a knitted fabric, a piece of hosiery, a knit, a non-woven scrim, a batt and a textile composite material, each composed of activated carbon fibres.

2. Textile sheetlike structure according to claim 1, wherein the two sheetlike pieces made of activated carbon fibres are only joined together via the support layer.

3. Textile sheetlike structure according to claim 1, wherein the two sheetlike pieces made of activated carbon fibres are additionally joined together in the overlapping region.

4. Textile sheetlike structure according to claim 1, wherein the two sheetlike pieces made of activated carbon fibres are adhered to the support layer by an adhesive applied in discontinuous manner in the form of non-cohering dots of adhesive.

5. Textile sheetlike structure according to claim 1, wherein, in addition, a textile covering layer is laminated onto those sides of the first and second sheetlike pieces made of activated carbon fibres which are opposite the support layer, wherein the two sheetlike pieces made of activated carbon fibres are adhered to the covering layer by an adhesive applied in discontinuous manner in the form of non-cohering dots of adhesive.

6. Textile sheetlike structure according to claim 5, wherein the two sheetlike pieces made of activated carbon fibres are additionally joined together by the covering layer.

7. Textile sheetlike structure according to claim 1, wherein the first and/or the second sheetlike pieces made of activated carbon fibres are each an activated carbon fibre sheetlike structure having an area-related weight (basis weight) in the range of from 50 to 250 g/m$^2$ and a thickness in the range of from 0.1 to 10 mm.

8. Textile sheetlike structure according to claim 1, wherein the activated carbon fibres of the first and/or second sheetlike pieces are filament fibres consisting of carbonized and activated cellulose, viscose or polyacrylonitrile.

9. Textile sheetlike structure according to claim 1, wherein the activated carbon fibres of the first and/or second sheetlike pieces have a titre (fibre fineness) in the range of from 0.8 to 1.2 denier, a tensile strength of more than 1.5 g/denier, a tensile elongation of more than 8% and a unit weight in the range of from 1.0 to 2.0 g/m.

10. Textile sheetlike structure according to claim 1, wherein the activated carbon fibres of the first and/or second sheetlike pieces are of low flammability and have a Limiting Oxygen Index (LOI) of not less than 50%.

11. Textile sheetlike structure according to claim 1, wherein the activated carbon fibres of the first and/or second sheetlike pieces are impregnated with one or more catalysts selected from the group consisting of enzymes and metal ions selected from the group of ions of copper, silver, cadmium, platinum, palladium, zinc and mercury, wherein the catalyst is present in amounts in the range of from 0.05% to 12% by weight, based on the weight of the activated carbon fibres.

12. Textile sheetlike structure according to claim 1, wherein the activated carbon fibres of the first and/or second sheetlike pieces have an internal surface area (BET) in the range of from 800 to 2,000 m²/g.

13. Textile sheetlike structure according to claim 1, wherein the support layer and the covering layer have identical or different area-related weights (basis weights).

14. Textile sheetlike structure according to claim 1, wherein the support layer, the first sheetlike piece made of activated carbon fibres, the second sheetlike piece made of activated carbon fibres and the covering layer are water-pervious, water-vapour-pervious and gas-pervious.

15. Textile sheetlike structure for protection against biological and chemical noxiants and poisons such as biological and chemical warfare agents and the like, said sheetlike structure comprising:
   a textile support layer and a first sheetlike piece made of activated carbon fibres, said first sheetlike piece being laminated onto said support layer;
   wherein said sheetlike structure further comprises a second sheetlike piece made of activated carbon fibres, said second sheetlike piece being laminated onto said support layer such that edges of said two sheetlike pieces touch and/or overlap;
   wherein said two sheetlike pieces are joined together seamlessly to said support layer;
   wherein said two sheetlike pieces made of activated carbon fibres are laminated onto said support layer by adhering;
   wherein said first and/or second sheetlike pieces made of activated carbon fibres are selected from the group consisting of a textile woven, a fabric, a cloth, a non-woven, a knitted fabric, a piece of hosiery, a knit, a non-woven scrim, a batt and a textile composite material, each composed of activated carbon fibres; and
   wherein, in addition, a textile covering layer is laminated onto those sides of said first and second sheetlike pieces made of activated carbon fibres which are opposite said support layer, said two sheetlike pieces made of activated carbon fibres being adhered to said covering layer by an adhesive applied in discontinuous manner in the form of non-cohering dots of adhesive such that said two sheetlike pieces made of activated carbon fibres are additionally joined together by said covering layer.

16. A protective material, said protective material comprising a textile sheetlike structure according to claim 1.

17. Protective material according to claim 16, said protective material being selected from the group consisting of protective suits, protective jackets, protective trousers, protective gloves, protective footwear, protective clothing items, protective covers and protective sleeping bags.

18. A protective material, said protective material comprising a textile sheetlike structure according to claim 15.

19. Protective material according to claim 18, said protective material being selected from the group consisting of protective suits, protective jackets, protective trousers, protective gloves, protective footwear, protective clothing items, protective covers and protective sleeping bags.

20. A protective article to be utilized by a human, said protective article being from the group consisting of protective suits, protective jackets, protective trousers, protective gloves, protective footwear, protective clothing items, protective covers and protective sleeping bags, wherein said protective article being fabricated from a protective material that comprises a textile sheetlike structure according to claim 1.

21. A protective article to be utilized by a human, said protective article being from the group consisting of protective suits, protective jackets, protective trousers, protective gloves, protective footwear, protective clothing items, protective covers and protective sleeping bags, wherein said protective article being fabricated from a protective material that comprises a textile sheetlike structure according to claim 15.

* * * * *